(12) United States Patent
Buot

(10) Patent No.: US 7,047,018 B2
(45) Date of Patent: May 16, 2006

(54) DATA TRANSMISSION METHOD AND SYSTEM

(75) Inventor: Theodore Buot, Singapore (SG)

(73) Assignee: Nokia Corporation, Espoo (FI)

( * ) Notice: Subject to any disclaimer, the term of this patent is extended or adjusted under 35 U.S.C. 154(b) by 359 days.

(21) Appl. No.: 10/701,072

(22) Filed: Nov. 5, 2003

(65) Prior Publication Data

US 2004/0141473 A1 Jul. 22, 2004

(30) Foreign Application Priority Data

Nov. 7, 2002 (FI) .................. PCT/FI02/00870

(51) Int. Cl.
*H04Q 7/20* (2006.01)

(52) U.S. Cl. .................. 455/453; 455/450; 455/452; 455/447; 455/522; 455/451; 455/452.1; 455/452.2; 455/432.1; 455/453; 455/454; 455/455; 370/328; 370/335; 370/311; 370/353

(58) Field of Classification Search ............... 455/453, 455/450, 452, 442, 522, 451, 452.1, 452.2, 455/432.1, 454; 320/328, 335, 311, 303
See application file for complete search history.

(56) References Cited

U.S. PATENT DOCUMENTS

| | | | |
|---|---|---|---|
| 2002/0077113 A1* | 6/2002 | Spaling et al. | 455/453 |
| 2003/0003921 A1* | 1/2003 | Laakso | 455/453 |
| 2003/0060209 A1* | 3/2003 | Bruin et al. | 455/452 |
| 2004/0063434 A1* | 4/2004 | Hamalainen et al. | 455/450 |
| 2004/0085935 A1* | 5/2004 | Robinson et al. | 370/335 |
| 2004/0209619 A1* | 10/2004 | Crisan | 455/450 |
| 2005/0013273 A1* | 1/2005 | Zhang | 370/328 |

FOREIGN PATENT DOCUMENTS

| | | |
|---|---|---|
| EP | 1 180 881 A1 | 2/2002 |
| WO | WO 00/55976 | 9/2000 |
| WO | WO 01/22617 A2 | 3/2001 |
| WO | WO 02/089512 A1 | 11/2002 |

* cited by examiner

*Primary Examiner*—Joseph Feild
*Assistant Examiner*—David Q. Nguyen
(74) *Attorney, Agent, or Firm*—Squire, Sanders & Dempsey LLP

(57) ABSTRACT

The invention relates to a radio telecommunication system comprising means (508) for determining a bit rate increase in a cell on the basis of capacity requests, means (508) for estimating the increase of transmission power caused by the capacity increase, means (508, 518) for determining the cell power on the basis of the current cell power and the estimated power increase, means (508, 518) for estimating the increase of the transmission power needed in the neighbouring cells caused by the capacity growth in the current cell, means (508) for limiting the resource allocation in the cell requesting capacity.

16 Claims, 4 Drawing Sheets

DATA TRANSMISSION METHOD AND SYSTEM

FIELD

Figure 1:
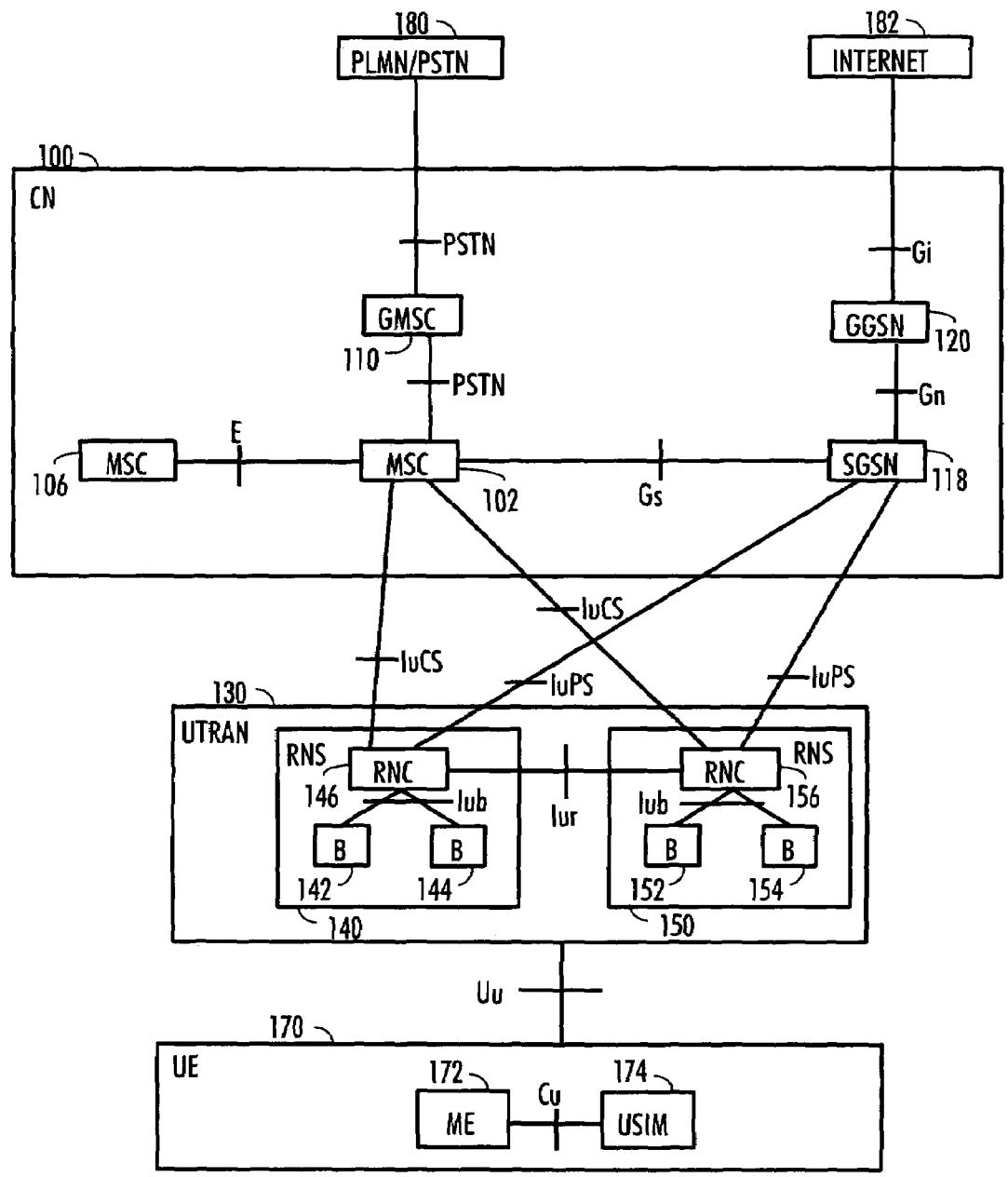

The invention relates to a data transmission method and system in a radio telecommunication system.

BACKGROUND

In Code Division Multiple Access systems (CDMA), several users share the same frequency. Different users are separated from each other by codes. The use of the same frequency causes interference to other cells. The transmit power control is the most important parameter used to limit the interference, because the higher the power, the more interference. This is why the power control is the key issue especially in the CDMA systems.

There are, however, many problems in the power control. For instance, the calculation of the load factor or of the capacity utilisation need the estimation of the interference caused by other cells. The interference originating from neighbouring cells can be even 40 percent of the total interference in the cell. Attention also had to be paid to the fact that the downlink interference varies for every user of the cell mainly due to the variation of locations. Another fact which has to be taken into consideration is that the user equipment only knows the total interference. All these matters make the power control estimation and thereby power restriction difficult in the CDMA systems especially in multi-cell environments.

BRIEF DESCRIPTIONS OF THE INVENTION

It is an object of the invention to provide an improved method for allocating resources for users in a cellular radio system using the code division multiple access. This is achieved by a data transmission method in a radio telecommunication system, comprising: setting a maximum value for cell power, determining a bit rate increase in a cell on the basis of capacity requests, estimating the increase of the transmission power in a cell caused by the capacity increase, determining the cell power on the basis of the current cell power and the estimated power increase, estimating the increase of the transmission power needed in the neighbouring cells caused by the capacity growth in the current cell, if the cell power of any of the neighbouring cells exceeds the maximum value, limiting the resource allocation in the cell requesting capacity.

The invention also relates to a data transmission method in a cellular telecommunication system, comprising: setting a maximum value for a cell power, determining bit rate increases in cells on the basis of capacity requests, evaluating the costs of the additional loads due to the capacity requests, estimating the increase of the transmission power in the current cell caused by the capacity growth, determining the cell power of the current cell on the basis of the current cell power and the estimated power increase, estimating the increase of the transmission power needed in the neighbouring cells caused by the capacity growth in the current cell, allocating resources in a growing order of the costs, if the cell power of any of the neighbouring cells exceeds the maximum value, limiting the resource allocation in the cell requesting capacity.

The invention also relates to a radio telecommunication system comprising means for determining a bit rate increase in a cell on the basis of capacity requests, means for estimating the increase of transmission power caused by the capacity increase, means for determining the cell power on the basis of the current cell power and the estimated power increase, means for estimating the increase of the transmission power needed in the neighbouring cells caused by the capacity growth in the current cell, means for limiting the resource allocation in the cell requesting capacity.

The invention also relates to a radio telecommunication system comprising means for determining a bit rate increase in a cell on the basis of capacity requests, means for evaluating the cost of an additional load, means for allocating resources in a growing order of costs, means for estimating the increase of transmission power caused by the capacity increase, means for determining the cell power on the basis of the current cell power and the estimated power increase, means for estimating the increase of the transmission power needed in the neighbouring cells caused by the capacity growth in the current cell, means for limiting the resource allocation in the cell requesting capacity.

The invention also relates to a radio network controller, comprising determining means for determining a bit rate increase in a cell on the basis of capacity requests, estimating means for estimating the increase of transmission power caused by the capacity increase, determining means for determining the cell power on the basis of the current cell power and the estimated power increase, estimating means for estimating the increase of the transmission power needed in the neighbouring cells caused by the capacity growth in the current cell, limiting means for limiting the resource allocation in the cell requesting capacity.

The invention also relates to a radio network controller, comprising determining means for determining a bit rate increase in a cell on the basis of capacity requests, determining means for evaluating the cost of an additional load, determining means for allocating resources in a growing order of costs, estimating means for estimating the increase of transmission power caused by the capacity increase, determining means for determining the cell power on the basis of the current cell power and the estimated power increase, estimating means for estimating the increase of the transmission power needed in the neighbouring cells caused by the capacity growth in the current cell, limiting means for limiting the resource allocation in the cell requesting capacity.

Preferred embodiments of the invention are described in the dependent claims.

The method and system of the invention provide several advantages. In a preferred embodiment of the invention, it is possible to control the transmission power of each cell or sector in order to avoid the exceeding of the given maximum value.

LIST OF THE DRAWINGS

Figure 2:
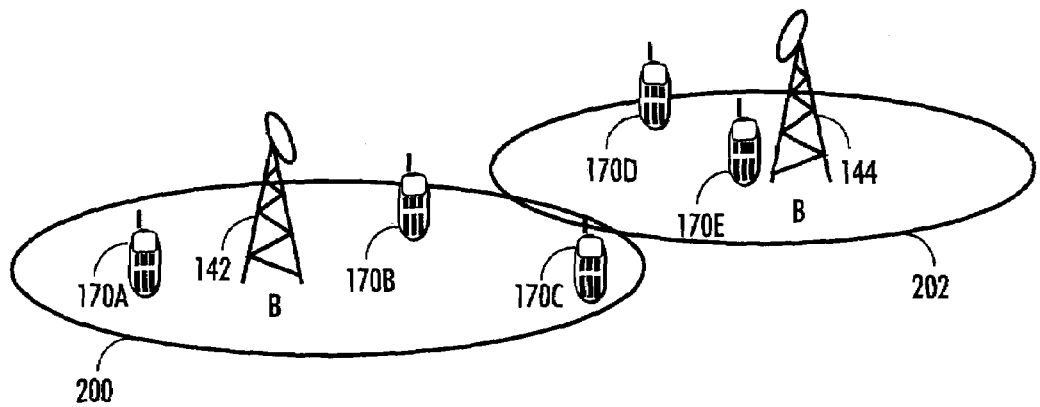
Figure 5:
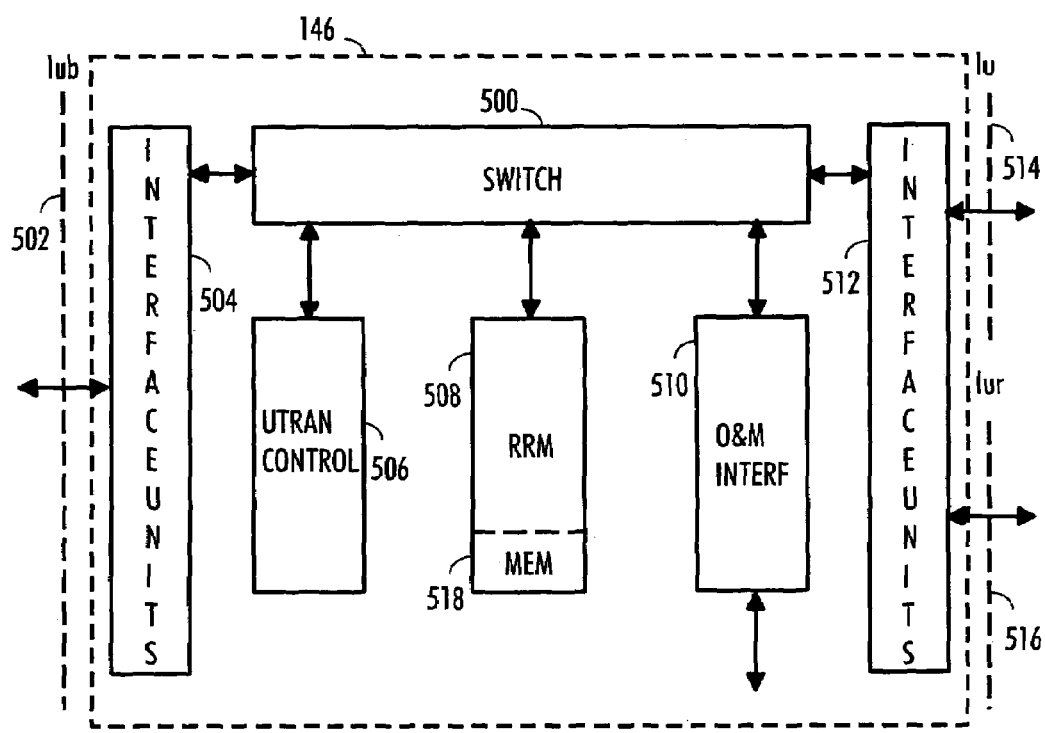
Figure 3:
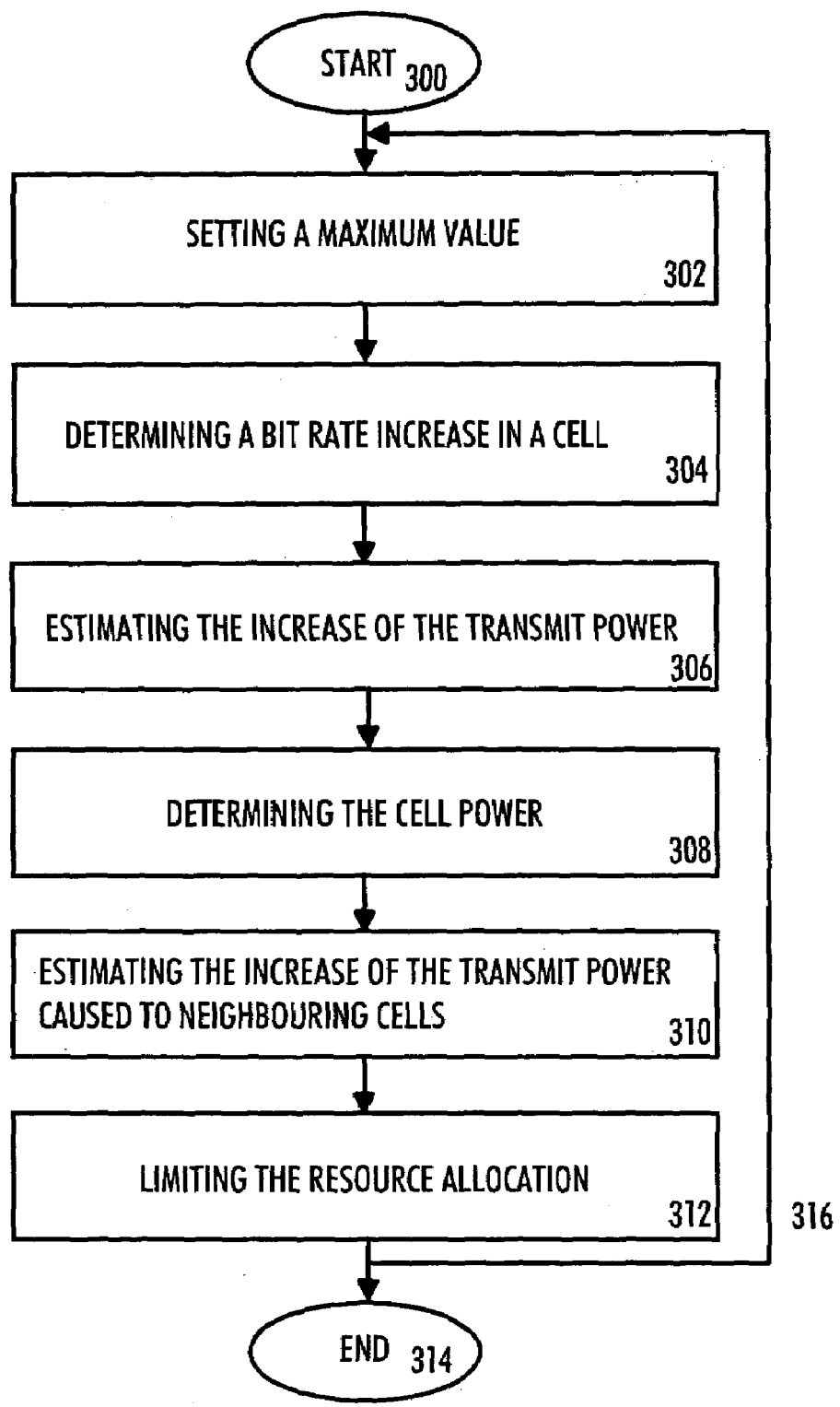
Figure 4:
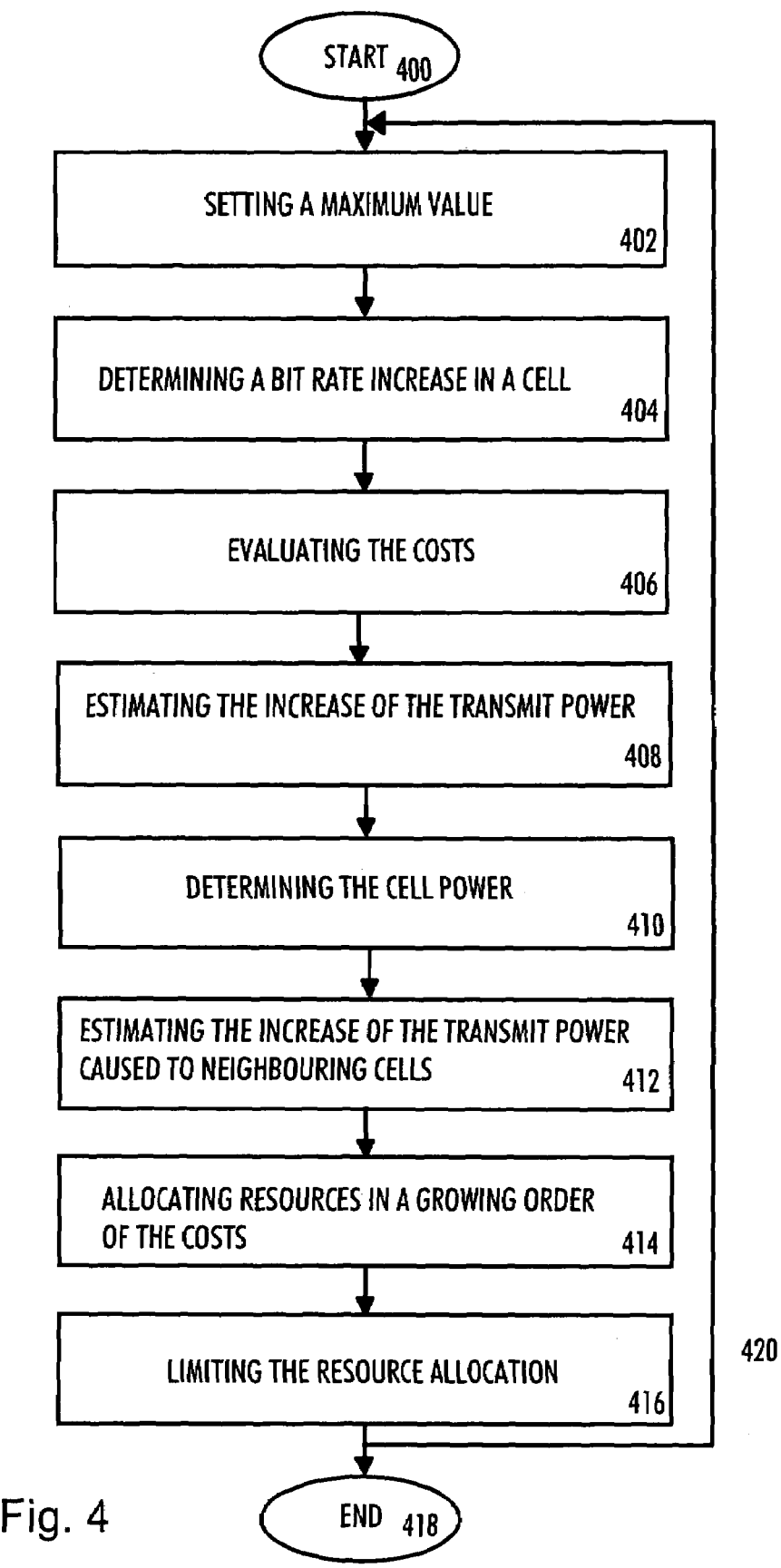

In the following, the invention will be described in greater detail with reference to the preferred embodiments and the accompanying drawings, in which FIG. 1 shows an example of a CDMA-system, FIG. 2 shows an example of a cellular network, FIG. 3 is a flow chart, FIG. 4 is another flow chart and FIG. 5 illustrates an example of a radio network controller.

DESCRIPTION OF THE EMBODIMENTS

With reference to FIG. 1, examine an example of a data transmission system in which the preferred embodiments of the invention can be applied. The invention can be implemented in the RNC (Radio Network Controller) and/or BS (Base Station) and can e.g. be a part of RAN (Radio Access Network) for instance UTRAN (UMTS Terrestrial Radio Access Network) solution as well as IPRAN (Internet Protocol RAN).

In FIG. 1 the embodiments are described in a simplified radio system, which represents a Code Division Multiple Access, CDMA, system. The Code Division Multiple Access technique is used nowadays for example in radio systems which are known at least by the names IMT-2000 (International Mobile Telecommunications 2000) and UMTS (Universal Mobile Telecommunications System). The embodiments are not, however, restricted to these systems given as examples but a person skilled in the art may apply the solution in other radio systems provided with the necessary properties.

FIG. 1 is a simplified block diagram, which describes the most important network elements of the radio system and the interfaces between them. The structure and function of the network elements are not described in detail because they are generally known.

The main parts of the radio system are a core network (CN) 100, a radio access network 130 and user equipment (UE) 170. The term UTRAN is an abbreviation from UMTS Terrestrial Radio Access Network, i.e. the radio access network belongs to the third generation and is implemented by wideband code division multiple access WCDMA. Generally, the radio system can also be defined as follows: the radio system consists of a user terminal, which is also called a subscriber terminal or a mobile station, and of a network part, which includes the fixed infrastructure of the radio system, i.e. a core network, a radio access network and a base station system.

A mobile services switching centre (MSC) 102 is the centre of the circuit-switched side of the core network 100. The mobile services switching centre 102 is used to serve the connections of he radio access network 130. The tasks of the mobile services switching centre 102 typically include switching, paging, user terminal location registration, handover management, collection of subscriber billing information, data encryption parameter management, frequency allocation management and echo cancellation.

The number of mobile services switching centres 102 may vary: a small network operator may have only one mobile services switching centre 102, whereas large core networks 100 may have several ones. FIG. 1 shows another mobile services switching centre 106 but its connections to other network elements are not illustrated to keep FIG. 1 sufficiently clear.

Large core networks 100 may comprise a separate gateway mobile services switching centre (GMSC) 110, which is responsible for circuit-switched connections between the core network 100 and the external networks 180. The gateway mobile services switching centre 110 is located between the mobile services switching centres 102, 106 and the external networks 180. The external network 180 may be, for example, a public land mobile network PLMN or a public switched telephone network PSTN.

The core network 100 typically comprises other parts, too, such as a home location register HLR, which includes a permanent subscriber register and, if the radio system supports the GPRS, a PDP address (PDP=Packet Data Protocol), and a visitor location register VLR, which includes information on roaming of the user terminals 170 in the area of the mobile services switching centre 102. Not all the parts of the core network are shown in FIG. 1 to keep it clear.

A serving GPRS support node (SGSN) 118 is the centre of the packet-switched side of the core network 100. The main task of the serving GPRS support node 118 is to transmit and receive packets with the user terminal 170 supporting packet-switched transmission, utilizing the radio access network 130. The serving GPRS support node 118 includes user information and location information on the user terminal 170.

A gateway GPRS support node (GGSN) 120 on the packet-switched side corresponds to the gateway mobile services switching centre 110 of the circuit-switched side, with the exception that the gateway GPRS support node 120 has to be able to route outgoing traffic from the core network 100 to external networks 182, whereas the gateway mobile services switching centre 110 routes only the incoming traffic. In the example, the external networks 182 are represented by the Internet, via which a considerable part of wireless telephone traffic can be transmitted in the future.

The radio access network 130 consists of radio network subsystems 140, 150. Each radio network subsystem 140, 150 consists of radio network controllers (RNC) 146, 156 and B nodes 142, 144, 152, 154. The B node is rather an abstract concept, which is frequently replaced by the term 'base station'.

The radio network controller 146, 156 is usually responsible for the following tasks, for example: management of the radio resources of the base transceiver station or B-node 142, 144, 152, 154, intercell handover, measurement of time delays on the uplink, implementation of the operation and management interface, and management of power control.

The radio network controller 146, 156 includes at least one transceiver. One radio network controller 146, 156 may serve one cell or several sectorized cells. The cell diameter may vary from a few metres to dozens of kilometres. The radio network controller 146, 156 is often deemed to include a transcoder, too, for performing conversion between the speech coding format used in the radio system and the speech coding format used in the public switched telephone system. In practice the transcoder, however, is usually located in the mobile services switching centre 102. The radio network controller 146, 156 is usually responsible for the following tasks, for example: measurements on the uplink, channel coding, encryption and scrambling coding.

The user terminal 170 consists of two parts: mobile equipment (ME) 172 and a UMTS subscriber identity module (USIM) 174. The user terminal 170 comprises at least one transceiver for establishing a radio connection to the radio access network 130. The user terminal 170 may include at least two different subscriber identity modules. In addition, the user terminal 170 comprises an antenna, a user interface and a battery. Nowadays various kinds of user terminals 170 are available, e.g. terminals that are installed in a car and portable terminals. The user terminals 170 also have properties similar to those of a personal computer or a portable computer.

The USIM 174 includes information on the user and information on data security, e.g. an encryption algorithm, in particular.

It is obvious to a person skilled in the art that the interfaces included in the radio telecommunications system are determined by the hardware implementation and the standard used, for which reason the interfaces of the system may differ from those shown in FIG. 1. In the UMTS, the most important interfaces are the Iu interface between the core network and the radio access network, which is divided into the IuCS (CS=Circuit Switched) interface of the circuit-switched side and the IuPS (PS=Packet Switched) interface of the packet-switched side, and the Uu interface between the radio access network and the user terminal. The interface defines what kind of messages different network elements may use to communicate with one another. The object of the standardisation of interfaces is to enable function between network elements of different producers. In practice, however, some of the interfaces are producer-specific.

FIG. 2 illustrates a simplified example of a cellular network. In the DMA systems the same frequency is shared between several users separated by different codes. The same frequency is typically used in several cells, too. The result of the sharing the same frequency is that other cells and cross-talking cause quite a lot of interference to each user. Thus an efficient power control is one of the main problems in the CDMA systems. The transmission power of each user has to be restricted to be as low as possible in the limits of the acceptable error rate.

In the example of the FIG. 2, there are two cells 200, 202. Both of the base stations 142, 144 use the same carrier frequency. There are several user terminals 170A–E in the two cells. The user terminals cause interference to each other, because the codes used to separate them, often called channelisation codes, are not totally uncorrelated to each other. In adjusting the transmission power one also has to pay attention to the fact that the nearer the cell edge the mobile is, the more the transmitted signal attenuates.

FIG. 3 is a flowchart describing an embodiment of a data transmission method, which suits especially the circumstances described with the aid of the example of FIG. 2. The method is related to the admission control and load control procedures. The principle of the admission control is to check that the admittance of the new connection will not restrict the planned coverage area or make the quality of existing connection worse. The main target of the load control is to ensure that the system is not overloaded and remains stable. In this application, the term cell is used to mean both a radio cell and a sector.

In the method, terminals measure one or more values which describe the level or the quality of the neighbouring cells pilots. These measurements can be utilized in the interference estimation. The radio network controller typically has information on the transmission powers of all the cells. It also has information on the quality of the pilot signals of all the cells, often called as CPICHE$_c$/I$_o$, that is to say Common Pilot Channel energy-to-noise-density, which are measured by terminals and reported periodically to radio network controllers. The terminals carry out these measurements particularly when they are about to perform a soft handover. The terminals report the neighbouring cell measurements to the radio network controller. These measurements can be, for instance, above-mentioned energy-to-noise-density ratio (E$_c$/I$_o$) measurements. Thus the radio network controller knows the total power in every cell.

In addition, it should be noticed that resource management, in other words resource allocations and releases, is the usual task of the radio network controller.

The embodiment of the method starts from block 300. The method is especially beneficial in clarifying the influence of the expected power increase in one cell on the other cells. In block 302 a maximum value is set for cell power in each cell is set. The maximum value is preferably based on the limit for allowable interference caused by the cell for the other cells. Thus the maximum values can differ, for instance, in the function of time or they can be different for every cell. The adaptation of the method does not restrict the selection of the maximum values. If the cells are of the same size, the maximum values are typically set to be the same for all of the cells. With the aid of the method, the transmission powers can be controlled to be under the set limits or at least near them.

In block 304, a bit rate increase in a cell is determined. The current power and bit rates used are known, and the increase is determined on the basis of the capacity requests. The capacity is needed for sending speech, packet data, picture etc. The increase of the bit rate depends on the amount of the requested connections as well as on their type; speech needs a lower bit rate than a picture, for example.

In block 306, the increase of the transmission power in a cell caused by the capacity increase is estimated; the bit rate increase causes, of course, a power increase. The power increase is preferably determined by using a derivative method, an integral method or both. By using the derivative method, the power increase is determined $$\Delta P_s = \frac{\Delta L}{1-(LF)} \cdot P_s \qquad (1)$$

where
$\Delta P_s$=increase of the transmission power of the cell,
$\Delta L$=increase of the load of the cell,
$P_s$=the current transmission power of the cell
LF=a load factor, which can be determined as an average of Eb/No, which is typically replaceable with the measured signal-to-noise ratio.

By using the integral method, the power increase is determined $$\Delta P_s = \frac{\Delta L}{1-(LF)-\Delta L} \cdot P_s, \qquad (2)$$

where
$\Delta P_s$=increase of the transmission power of the cell,
$\Delta L$=increase of the load of the cell,
$P_s$=the current transmission power of the cell,
LF=a load factor, which can be determined as an average of Eb/No, which is typically similar to the measured signal-to-noise ratio.

In block 308, the cell power is determined on the basis of the current cell power and the estimated power increase. This is done preferably by adding the estimated power increase to the known current power.

In block 310, the increase of the transmission power needed in the other, typically neighbouring cells due to the capacity increase is estimated.

The total power of a cell is determined with the aid of estimating the current cell interference and the interference caused by other cells, thus adjacent cells affect considerably to each other's interference level. The location of a user affects the interference: if the user is near the cell edge, the interference from the neighbouring cell is stronger than if the user were far from the edge.

The amount of the interference affecting mobile u in cell j, that is to say the cell of interest, originating from another cell k can be expressed in relation to the current cell interference (the interference originating from the cell j) as follows $$f_i(u,k) = \frac{P_s(k)\gamma(u,k)}{[P_s(j) - P_{DL}(u,j)][1-\alpha]\gamma(u,j)}, \qquad (3)$$

where
u is a user number, j is a cell of interest, $P_s(k)$ is the transmission power of cell k, γ(u, k) is the propagation attenuation between the user and cell k, γ is a factor, which is typically equivalent to $E_c/I_o(u,k)$ multiplied by a selected constant. The $E_c/I_o(u,k)$ values are available in the radio network controller due to the mobile measurements, α is the downlink orthogonality of the current cell interference, $P_{DL}(u, j)$ is the downlink power allocated to user u at cell j, k is a chosen cell, typically an adjacent cell.

If the proportion of interference to every user in cell j originating from cell k is known, then the ratio of interference from cell k into the cell j is $$F(k) = \frac{\sum_u f_i(u, k) P_{DL}(u, k)}{P_s(j)}, \quad (4)$$

where $f_i$ is the amount of the interference affecting to mobile u in cell j originating in another cell k related to the current cell interference, u is a user number, j is a cell of interest, $P_s(k)$ is the transmission power of cell j, $P_{DL}(u, j)$ is the downlink power allocated to user u at cell k, k is a chosen cell, typically an adjacent cell.

The transmission power in cell j is naturally proportional to the total interference in cell j and is derived from the downlink load curve. The power can thus be expressed as follows $$P_s(j) = C \cdot [I(j) + I(k) + I(l) + \ldots], \quad (5)$$

where

C is a predetermined constant typically used as a scaling factor,

I(j) is an interference originating from cell j (the cell of interest),

I(k), I(l) etc. are interferences originating from the other cells.

The terms I(k), I(l) etc. can be replaced by the interference factors F(k), F(l) etc. The interference factors representing the interference affecting to mobile u in cell j originating in other cells are denoted as related to the current cell interference in the formula (4). Thus the power can be expressed as follows $$P_s(j) = C \cdot I(j)[1 + F_{tot}], \quad (6)$$

where

C is a predetermined constant typically used as a scaling factor,

I(j) is an interference originating from cell j (the cell of interest), $F_{tot}$ is the total interference coming from other cells into cell j.

The increase of power in cell j caused by the increase of the transmission power in cell k is calculated by the formula $$P_s'(j) = P_s(j)(1 + F'_{tot})/(1 + F_{tot}), \quad (7)$$

where $P_s(j)$ is the power before the increase, called in this application current power, $F_{tot}'$ is the total interference factor due to the power increase, $F_{tot}$ is the interference factor before the power increase (that is to say due to the current power).

The change of the interference in cell j caused by the increase of the transmission power in cell k is determined $$'\Delta F(k) = (I + F_{tot}) \cdot \Delta P_s(k) / P_s(k), \quad (8)$$

where $F_{tot}$ is the same as in the equations (5) and (6), $\Delta P_s(k)$ is the increase of the transmission power in cell k, $P_s(k)$ is the current transmission power in cell k.

If the cell power of any of the neighbouring cells exceeds the maximum value, then the resource allocation in the cell requesting capacity is limited in order to avoid the interference level exceeding the boundary of the interference tolerance of the system in block 312. The resource allocation can be restricted by offering lower bit rates or by limiting the number of new users.

The method can be repeated till there is no longer a cell which exceeds the upper limit of the maximum power. Pointer 316 represents this repeating process. The method ends in block 314.

FIG. 4 is a flowchart describing another embodiment of the data transmission method, which suits especially the circumstances described with the aid of the example of FIG. 2. The method is related to the admission control and load control procedures. The principle of the admission control is to check that the admittance of the new connection will not restrict the planned coverage area or make the quality of existing connection worse. The main target of the load control is to ensure that the system is not overloaded and remains stable. In this application, the term cell is used to mean both a radio cell and a sector.

In the method, terminals measure one or more values, which describe the level or the quality of the neighbouring cells pilots. These measurements can be utilized in the interference estimation. The radio network controller typically has information on the transmission powers of all the cells. It also has information on the quality of the pilot signals of all the cells, often called as $CPICHE_c/I_o$, that is to say Common Pilot Channel energy-to-noise-density, which are measured by terminals and reported periodically to radio network controllers. The terminals carry out these measurements particularly when they are about to perform a soft handover. The terminals report the neighbouring cell measurements to the radio network controller. These measurements can be, for instance, above-mentioned energy-to-noise-density ratio ($E_c/I_o$) measurements. Thus the radio network controller knows the total power in every cell.

In addition, it should be noticed that resource management, in other words resource allocations and releases, is the task of the radio network controller.

The embodiment of the method starts from block 400.

The method is especially beneficial in clarifying the influence of the expected power increase in one cell on the other cells. In a block 402 a maximum value is set for a cell power in each cell. The maximum value is preferably based on the limit for allowable interference caused by the cell for the other cells. Thus the maximum values can differ, for instance, in the function of time or they can be different for every cell. The adaptation of the method does not restrict the selection of the maximum values. If the cells are of the same size, the maximum values are typically set to be the same for all of the cells. With the aid of the method described here, the transmission powers can be controlled to be under the set limits or at least near them.

In block 404, the bit rate increases in the cells are determined. The current powers and bit rates used are known, and the increases are determined on the basis of the capacity requests. Typically, the increases are determined to all the cells belonging to the same radio network controller or the predetermined amount of cells. The capacity is needed for sending speech, packet data, picture etc. The increase of the bit rate depends on the amount of the requested connections as well as on their type; speech needs a lower bit rate than a picture, for example.

In block 406 the costs of the additional loads are evaluated. The total cost function is the sum of the interference increases of the other, typically adjacent, cells. The cost function is evaluated by using the formula $$'\Delta F(j)=(I+F_{tot})\cdot \Delta P_s(j)/P_s(j) \qquad (9)$$

where
$F_{tot}$ is the same as in the equations (5) and (6),
$\Delta P_s(j)$ is the increase of the transmission power in cell k,
$P_s(j)$ is the current transmission power in cell k,
j means the cell of interest.

The total cost is the sum of $\Delta F(j)$ calculated for all chosen cells. The purpose of evaluating the cost function is to define the effects of the power increase in a certain cell on other cells.

In block 408 the increase of the transmission power in the current cell caused by the capacity growth is estimated. The bit rate increase causes, of course, power increase. The power increase is preferably determined by using a derivative method, an integral method or both. The methods are explained previously in the description with the aid of formulas (1) and (2).

In block 410 the cell power of the current cell is determined on the basis of the current cell power and the estimated power increase. This is done preferably by adding the estimated power increase to the known current power.

In block 412 the increase of the transmission power needed in the other, typically neighbouring, cells due to the capacity increase is estimated. This process has already been depicted with the aid of formulas (3) to (8).

In block 414 the resources are allocated in the growing order of costs. This means that the cell with the smallest cost function is the first from which the resources are reserved etc. This is done to ensure that the power increase is allocated to the cells, which cause least interference to other cells.

If the cell power of any of the neighbouring cells exceeds the maximum value, then the resource allocation in the cell requesting capacity is limited in order to avoid the interference level exceeding the boundary of the interference tolerance of the system in block 416. The resource allocation can be restricted by offering lower bit rates or by limiting the number of new users.

The method can be repeated till there is no longer a cell which exceeds the upper limit of the maximum power. Pointer 420 represents this repeating process. The method ends in block 418.

FIG. 5 shows a simplified example of a radio network controller (RNC) where the embodiments of the data transmission method can be accomplished. RNC is, as mentioned above, the switching and controlling element of UTRAN. UTRAN is the network element of the UMTS network. The switching unit 500 takes care of the connection between the core network and the user equipment. The radio network controller is located between the Iub 502 and Iu 514 interfaces. There is also an interface for inter-RNC transmission called Iur 516. Blocks 504 and 512 depict the interface units between the radio network controller and other networks. The precise implementation of the radio network controller is producer specific.

The functionality of the radio network controller can be classified into two classes: UTRAN radio resource management 508 and control functions 506. An operation and management interface function 510 serves as a medium for information transfer to and from network management functions. The radio resource management is a group of algorithms used to share and manage the radio path connection so that the quality and capacity of the connection are adequate. The most important radio resource management algorithms are handover control, power control, admission control, packet scheduling, and code management. The UTRAN control functions take care of functions related to the set-up, maintenance and release of a radio connection between base stations and user equipment.

The radio network controller performs the actions needed in the handover. Most of them belong to the radio resource management functions. The information on the other cell, typically adjacent cell, pilots, for example the results of the energy-to-noise-density ratio ($E_c/I_o$) measurements, is in this example stored the memory belonging to the radio resource management functions 518.

The disclosed functionalities of the described embodiments of the data transmission method can be advantageously implemented by means of software located typically in the radio resource management block 508 of the radio network controller.

Even though the invention is described above with reference to an example according to the accompanying drawings, it is clear that the invention is not restricted thereto but it can be modified in several ways within the scope of the appended claims.

The invention claimed is:

1. A data transmission method in a radio telecommunication system,
comprising:
setting a maximum value for cell power,
determining a bit rate increase in a cell on the basis of capacity requests,
estimating the increase of the transmission power in a cell caused by the capacity increase,
determining the cell power on the basis of the current cell power and the estimated power increase,
estimating the increase of the transmission power needed in the neighbouring cells caused by the capacity growth in the current cell,
if the cell power of any of the neighbouring cells exceeds the maximum value,
limiting the resource allocation in the cell requesting capacity.

2. A data transmission method in a cellular telecommunication system,
comprising:
setting a maximum value for a cell power,
determining bit rate increases in cells on the basis of capacity requests,
evaluating the costs of the additional loads due to the capacity requests,
estimating the increase of the transmission power in the current cell caused by the capacity growth, determining the cell power of the current cell on the basis of the current cell power and the estimated power increase, estimating the increase of the transmission power needed in the neighbouring cells caused by the capacity growth in the current cell, allocating resources in a growing order of the costs, if the cell power of any of the neighbouring cells exceeds the maximum value, limiting the resource allocation in the cell requesting capacity.

3. The method of claim 1, wherein a bit rate increase is determined by the aid of the current power and the bit rate as well as the capacity requests.

4. The method of claim 1, wherein the increase of the transmission power is estimated by the derivative method.

5. The method of claim 1, wherein the increase of the transmission power is estimated by the integral method.

6. The method of claim 1, wherein the increase of the transmission power caused for the neighbouring cells is estimated using the formula $P_s'(j)=P_s(j)(1+F'_{tot})/(1+F_{tot})$.

7. The method of claim 2, wherein the cost of the additional load is evaluated using the formula $'\Delta F(j)=(1+F_{tot})\cdot \Delta P_s(j)/P_s(j)$.

8. A radio telecommunication system, comprising:
means (508) for determining a bit rate increase in a cell on the basis of capacity requests,
means (508) for estimating the increase of transmission power caused by the capacity increase,
means (508, 518) for determining the cell power on the basis of the current cell power and the estimated power increase,
means (508, 518) for estimating the increase of the transmission power needed in the neighbouring cells caused by the capacity growth in the current cell,
means (508) for limiting the resource allocation in the cell requesting capacity, if the cell power of any of the neighboring cells exceeds the maximum value.

9. A radio telecommunication system, comprising:
means (508) for determining a bit rate increase in a cell on the basis of capacity requests,
means (508) for evaluating the cost of an additional load,
means (508, 518) for allocating resources in a growing order of costs,
means (508) for estimating the increase of transmission power caused by the capacity increase,
means (508, 518) for determining the cell power on the basis of the current cell power and the estimated power increase,
means (508, 518) for estimating the increase of the transmission power needed in the neighbouring cells caused by the capacity growth in the current cell,
means (508) for limiting the resource allocation in the cell requesting capacity, if the cell power of any of the neighboring cells exceeds the maximum value.

10. The system of claim 9, the system further comprises means (508, 518) for determining a bit rate increase by the aid of the current power and the bit rate as well as the capacity requests.

11. The system of claim 9, the system further comprises means (508, 518) for estimating the increase of the transmission power by the derivative method.

12. The system of claim 9, the system further comprises means (508, 518) for estimating the increase of the transmission power by the integral method.

13. The system of claim 9, the system further comprises means (508, 518) for estimating the increase of the transmission power caused for the neighbouring cells using the formula $P_s'(j)=P_s(j)(1+F'_{tot})/(1+F_{tot})$.

14. The system of claim 9, the system further comprises means (508, 518) for evaluating the cost of the additional load using the formula $'\Delta F(j)=(1+F_{tot})\cdot \Delta P_s(j)/P_s(j)$.

15. A radio network controller, comprising:
determining means (508) for determining a bit rate increase in a cell on the basis of capacity requests,
estimating means (508) for estimating the increase of transmission power caused by the capacity increase,
determining means (508, 518) for determining the cell power on the basis of the current cell power and the estimated power increase,
estimating means (508, 518) for estimating the increase of the transmission power needed in the neighbouring cells caused by the capacity growth in the current cell,
limiting means (508) for limiting the resource allocation in the cell requesting capacity, if the cell power of any of the neighboring cells exceeds the maximum value.

16. A radio network controller, comprising:
determining means (508) for determining a bit rate increase in a cell on the basis of capacity requests,
determining means (508) for evaluating the cost of an additional load,
determining means (508, 518) for allocating resources in a growing order of costs,
estimating means (508) for estimating the increase of transmission power caused by the capacity increase,
determining means (508, 518) for determining the cell power on the basis of the current cell power and the estimated power increase,
estimating means (508, 518) for estimating the increase of the transmission power needed in the neighbouring cells caused by the capacity growth in the current cell,
limiting means (508) for limiting the resource allocation in the cell requesting capacity, if the cell power of any of the neighboring cells exceeds the maximum value.

* * * * *